(12) United States Patent
Wilkinson et al.

(10) Patent No.: US 9,846,598 B2
(45) Date of Patent: Dec. 19, 2017

(54) MODIFYING A FLOW OF OPERATIONS TO BE EXECUTED IN A PLURALITY OF EXECUTION ENVIRONMENTS

(71) Applicant: Hewlett-Packard Development Company, L.P., Houston, TX (US)

(72) Inventors: William K. Wilkinson, San Mateo, CA (US); Alkiviadis Simitsis, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/781,899

(22) PCT Filed: Apr. 3, 2013

(86) PCT No.: PCT/US2013/035080
§ 371 (c)(1),
(2) Date: Oct. 1, 2015

(87) PCT Pub. No.: WO2014/163629
PCT Pub. Date: Oct. 9, 2014

(65) Prior Publication Data
US 2016/0034307 A1 Feb. 4, 2016

(51) Int. Cl.
*G06F 9/46* (2006.01)
*G06F 9/50* (2006.01)
*G06F 9/48* (2006.01)
*G06F 17/30* (2006.01)

(52) U.S. Cl.
CPC .......... *G06F 9/5011* (2013.01); *G06F 9/4856* (2013.01); *G06F 9/4881* (2013.01); *G06F 9/5038* (2013.01); *G06F 9/5083* (2013.01); *G06F 17/30563* (2013.01); *G06F 2209/506* (2013.01); *G06F 2209/5017* (2013.01)

(58) Field of Classification Search
None
See application file for complete search history.

(56) References Cited

U.S. PATENT DOCUMENTS

| 7,596,618 B2 * | 9/2009 | Basu ....................... H04L 45/46 455/453 |
| 7,693,982 B2 | 4/2010 | Goldszmidt et al. |
| 7,958,507 B2 * | 6/2011 | Santos ................... G06F 9/4887 718/100 |

(Continued)

FOREIGN PATENT DOCUMENTS

EP 2535810 A2 12/2012

OTHER PUBLICATIONS

Chen, F. et al, "A Performance Comparison of Parallel DBMSs and Mapreduce on Large-scale Text Analytics", Mar. 18-22, 2013.

(Continued)

*Primary Examiner* — Mehran Kamran
(74) *Attorney, Agent, or Firm* — Trop, Pruner & Hu, P.C.

(57) ABSTRACT

A flow of operations is to be executed in a plurality of execution environments according to a distribution. In response to determining that the distribution is unable to achieve at least one criterion, the distribution is modified according to at least one policy that specifies at least one action to apply to the flow of operations in response to a corresponding at least one condition relating to a characteristic of the flow of operations.

1 Claim, 5 Drawing Sheets

(56) References Cited

U.S. PATENT DOCUMENTS

| | | | |
|---|---|---|---|
| 8,015,564 B1 | 9/2011 | Beyer | |
| 8,276,153 B2 | 9/2012 | Horii | |
| 8,869,165 B2* | 10/2014 | Dasgupta | G06F 9/5038 |
| | | | 718/106 |
| 2006/0288346 A1* | 12/2006 | Santos | G06F 9/4887 |
| | | | 718/102 |
| 2007/0168919 A1 | 7/2007 | Henseler et al. | |
| 2007/0214171 A1 | 9/2007 | Behnen et al. | |
| 2007/0282880 A1 | 12/2007 | Cohen et al. | |
| 2009/0023452 A1 | 1/2009 | Quigley et al. | |
| 2009/0109230 A1* | 4/2009 | Miller | G06F 1/3203 |
| | | | 345/506 |
| 2009/0241117 A1* | 9/2009 | Dasgupta | G06F 9/5038 |
| | | | 718/101 |
| 2010/0005472 A1* | 1/2010 | Krishnaraj | G06F 9/5038 |
| | | | 718/104 |
| 2010/0043004 A1 | 2/2010 | Tambi et al. | |
| 2010/0070893 A1* | 3/2010 | Schreck | G06F 3/0481 |
| | | | 715/764 |
| 2010/0115095 A1 | 5/2010 | Zhu et al. | |
| 2010/0211815 A1* | 8/2010 | Mankovskii | G06F 11/0709 |
| | | | 714/2 |
| 2010/0251257 A1* | 9/2010 | Kim | G06F 9/5027 |
| | | | 718/105 |
| 2011/0047555 A1* | 2/2011 | Lakshmanan | G06F 9/5088 |
| | | | 718/105 |
| 2011/0093852 A1* | 4/2011 | Li | G06F 9/5066 |
| | | | 718/100 |
| 2011/0126209 A1* | 5/2011 | Housty | G06F 9/4405 |
| | | | 718/105 |
| 2011/0211447 A1 | 9/2011 | Wang et al. | |
| 2012/0063313 A1 | 3/2012 | Zhou et al. | |
| 2012/0131591 A1* | 5/2012 | Moorthi | G06Q 10/06 |
| | | | 718/104 |
| 2012/0158783 A1* | 6/2012 | Nice | G06Q 30/02 |
| | | | 707/776 |
| 2012/0240124 A1* | 9/2012 | Lipton | G06F 9/5066 |
| | | | 718/104 |
| 2012/0317579 A1* | 12/2012 | Liu | G06F 11/1438 |
| | | | 718/104 |
| 2013/0067493 A1 | 3/2013 | Dion | |
| 2013/0104140 A1* | 4/2013 | Meng | G06F 9/5066 |
| | | | 718/104 |
| 2013/0111493 A1* | 5/2013 | Quigley | G06F 9/5044 |
| | | | 718/104 |
| 2014/0141744 A1* | 5/2014 | Miluzzo | H04W 4/08 |
| | | | 455/406 |
| 2014/0156589 A1* | 6/2014 | Simitsis | G06F 17/30563 |
| | | | 707/602 |
| 2014/0207755 A1* | 7/2014 | Hacigumus | G06F 17/30463 |
| | | | 707/718 |
| 2014/0244570 A1* | 8/2014 | Simitsis | G06F 17/30563 |
| | | | 707/602 |
| 2014/0298349 A1* | 10/2014 | Jackson | G06Q 50/06 |
| | | | 718/104 |
| 2014/0325503 A1* | 10/2014 | Li | G06F 11/34 |
| | | | 717/177 |
| 2014/0344817 A1* | 11/2014 | Jovanovic | G06F 9/5066 |
| | | | 718/102 |

OTHER PUBLICATIONS

Zhou, L. et al, "Media-aware Distributed Scheduling Over Wireless Body Sensor networks", Jun. 5-9, 2011.

"The IBM zEnterprise EC12- Proven Hybrid Computing Designed to Manage Multiple Workloads with the Simplicity of a Single System", Aug. 28, 2012.

Boehm, Matthias, 'Cost-Based Optimization of Integration Flows.' Ph.D. thesis, Dresden University of Technology. 2011 (https://wwiAlb.inf.tu-dresden.de/mischeam/boehm/pubs/diss_final.pdf) See pp. 11-18.

Kllapi, Herald et al., 'Schedule Optimization for Data Processing Flows on the Cloud,' in: ACM SIGMOD International Conference on Management of data 2011. pp. 289-300, Jun. 12-16, 2011 (http://www.sigmod2011.org/index.shtml) See sections 6-7.

Simitsis. Alkis et al., 'HEMS: Managing the lifecycle and complexity of hybrid analytic data flows,' in: IEEE 29th International Conference on Data Engineering (ICDE) 2013, pp. 1174-1185. Apr. 8-12, 2013 See pp. 1176-1177 and 1179-1180; and figure 2.; (http://ieeexplore.ieee.org/xpl/mostRecentIssue.jsp-?punumber=6530811).

Springer Verlag, "Workflow Evolution: Generatin Hybrid Flows", Sep. 2, 2003.

* cited by examiner

MODIFYING A FLOW OF OPERATIONS TO BE EXECUTED IN A PLURALITY OF EXECUTION ENVIRONMENTS

BACKGROUND

Operations on data can be performed by different types of execution environments. For example, one execution environment can be a database management system (DBMS) environment, in which data is stored in relational tables and subject to database-based operations. As another example, an execution environment can include a MapReduce environment, which performs operations using map tasks and reduce tasks. There can also be other types of execution environments.

BRIEF DESCRIPTION OF THE DRAWING

Some embodiments are described with respect to the following figures.

DETAILED DESCRIPTION

Figure 1:
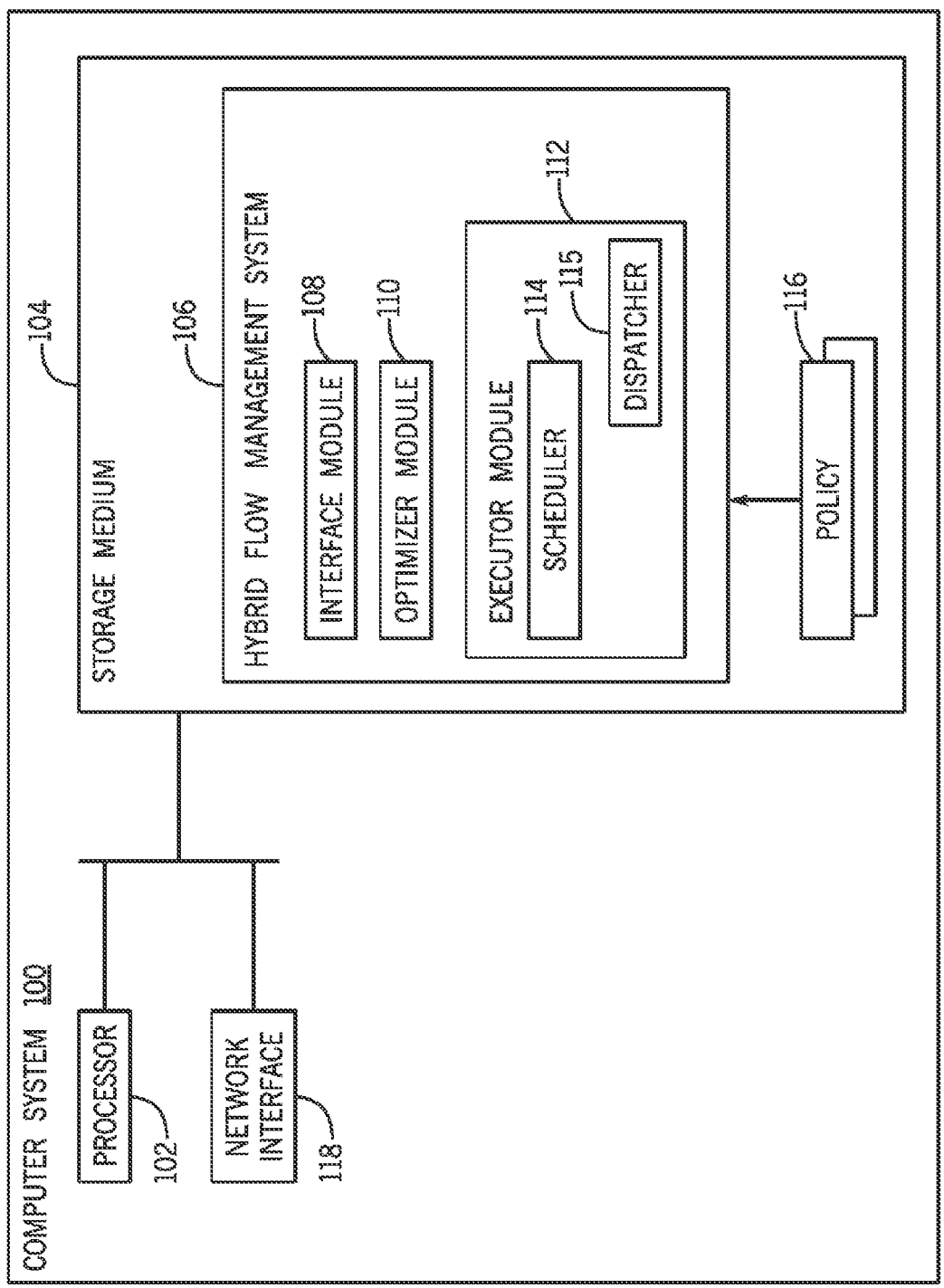
FIG. 1 is a block diagram of an example system according to some implementations.

Enterprises (e.g. business concerns, educational organizations, government agencies, etc.) can depend on reports and analyses (generally referred to as "computations") that integrate data from a diverse collection of data repositories and that operate on the data using a variety of execution environments. In some examples, a single analytic computation can be modeled as a directed graph in which starting nodes are data sources, ending nodes are data targets, intermediate nodes are data operations, and arcs represent data flow. Such a computation can be referred to as an analytic data flow (or simply a "flow"). In other examples, a flow can have a different representation (other than a directed graph). An analytic data flow that utilizes more than one data repository or execution environment is referred to as a hybrid analytic data flow (or simply a "hybrid flow"). A collection of analytic data flows that is managed as a unit for some objective (e.g. the flows should complete before a deadline, or an average response time of individual flows should not exceed a threshold, etc.) is referred to as a workload.

A hybrid flow can include collections of operations that are performed in different execution environments. Each collection of operations that is performed in a respective execution environment can be referred to as a flow fragment of operations.

Examples of different types of execution environments include at least some of the following: database management system (DBMS) environment, MapReduce environment, an extract, transform, and load (ETL) environment, or other execution environments. Each execution environment can include an execution engine and a respective storage repository of data. An execution engine can include one or multiple execution stages for applying respective operators on data, where the operators can transform or perform some other action with respect to data. A storage repository refers to one or multiple collections of data. An execution environment can be available in a public cloud or public network, in which case the execution environment can be referred to as a public cloud execution environment. Alternatively, an execution environment that is available in a private network can be referred to as a private execution environment.

A DBMS environment stores data in relational tables and applies database operators (e.g. join operators, update operators, merge operators, and so forth) on data in the relational tables. A MapReduce environment includes map tasks and reduce tasks that can apply a map function and a reduce function, respectively. A map task processes input data to produce intermediate results, based on the respective map function that defines the processing to be performed by the map task. A reduce task takes as input partitions of the intermediate results from the map task to produce an output, based on the corresponding reduce function that defines the processing to be performed by the reduce tasks.

Another example execution environment includes an ETL environment, which extracts data from a source (or multiple sources), transforms the data, and loads the transformed data into a destination.

Although specific types of different execution environments are listed above, it is noted that in other examples, other types of execution environments can be used to perform operations on data.

A workload (which includes a set of flows) can be associated with a target performance objective, which identifies one or multiple goals that are to be met by the execution of the workload. A performance objective can also be referred to as a service level objective. An example performance objective relates to an execution time (e.g. a time duration for executing the workload or a target deadline by which the workload is to be completed). Another example performance objective is a resource usage objective, which can specify that usage of resources, such as computing resources, storage resources, or communication resources, should not exceed a target level. In other examples, other performance objectives can be employed.

A multi-flow has multiple flow fragments (a flow fragment includes a portion of a flow), where each of the flow fragments run entirely in one execution environment, the flow fragments have a partial execution order, and the flow fragments are linked through a data transfer from source flow fragment to target flow fragment. A multi-flow can have flow fragments that all run in the same execution environment. Alternatively, a multi-flow can have flow fragments that run in multiple execution environments this latter multi-flow is referred to as a hybrid flow. Although a hybrid flow is a type of multi-flow, note that a multi-flow may or may not be a hybrid flow.

An execution plan for a hybrid flow specifies where (target execution environments) the flow fragments of the hybrid flow are to execute, and can specify other details associated with execution of the flow fragments (such as order). A single hybrid flow can have many alternative execution plans due to overlap in functionality among the execution environments, multiple implementation details for operations, objectives for the execution plans (e.g. objectives relating to fault-tolerance, latency, etc.), and so forth. Based on an execution plan for a hybrid flow, a management system can deploy the flow fragments of the hybrid flow in the target execution environments, and can orchestrate the execution of the hybrid flow. There can be several issues associated with deploying an execution plan in the target execution environments. First, the state of a computing infrastructure of at least one execution environment may have changed between the time the execution plan was produced and the time the execution plan is executed. For example, the execution environment may have become overloaded (such that there is contention for resources) or the computing infrastructure may have experienced a fault. Second, the hybrid flow is associated with a performance objective that has to be met. In some cases, penalties may be specified for not meeting performance objectives. Thus, the management system should ensure that target performance objectives are achieved.

In some examples, a workload manager may exist within an individual execution environment, and this workload manager can adjust a priority of a task, the number of concurrently running tasks, and so forth, to increase the likelihood that a workload within the individual execution environment meets a respective target objective. However, a workload manager within a single execution environment can only make decisions optimal for that environment. Such workload manager has no knowledge of that state of other execution environments. So, for a workload that has flows to be executed across a number of different types of execution environments, workload management becomes more challenging.

In accordance with some implementations, a hybrid flow management system is provided to apply a policy-based hybrid flow management that uses at least one policy to modify an execution plan to increase the likelihood that a hybrid flow that is to execute in multiple different types of execution environments can meet a performance objective of the hybrid flow (or its associated workload). A policy can specify performance of at least one action to apply to the hybrid flow in response to a corresponding at least one condition occurring. The condition can relate to a characteristic of the hybrid flow. As discussed further below, application of the at least one action causes a modification of the execution plan for the hybrid flow.

FIG. 1 is a block diagram of an example computer system 100 according to some implementations. The computer system 100 includes one or multiple processors 102 that are coupled to a volatile or non-volatile storage medium (or storage media) 104. A processor can include a microprocessor, microcontroller, processor module or subsystem, programmable integrated circuit, programmable gate array, or another control or computing device. The computer system 100 also includes a network interface 118 to allow the computer system 100 to communicate over a data network.

The storage medium (or storage media) 104 can store various data and machine-readable instructions. The machine-readable instructions can be executed by the processor(s) 102. In some implementations, the machine-readable instructions are part of a hybrid flow management system 106 that includes various example modules, including an interface module 108 an optimizer module 110, and an executor module 112.

The executor module 112 includes a scheduler 114 for scheduling flow fragments of a hybrid flow for execution in respective execution environments. The executor module 112 also includes a dispatcher 115 for dispatching the scheduled flow fragments to the respective execution environments. Note that the dispatched flow fragments can be in the form of executable code generated by the executor module 112 for the respective flow fragments. In addition, the executor module 112 is able to monitor flow execution.

The storage medium (or storage media) 104 can also store one or multiple policies 116, which can be used by the hybrid flow management system 106 to modify an execution plan to meet a performance goal of a hybrid flow.

The interface module 108 can receive a flow definition for creating or modifying a flow. As an example, the interface module 108 can present a graphical user interface (GUI) to allow for users to interactively create or modify a flow. Alternatively, a flow can be written in a declarative language and imported through the interface module 108. The flow that is created or modified using the interface module 108 can be a hybrid flow or non-hybrid flow.

The optimizer module 110 generates multiple candidate execution plans for each flow (hybrid flow or a non-hybrid flow). The optimizer module 110 is able to consider alternative candidate execution plans for a given flow, and can estimate the respective costs of the candidate execution plans. Examples of costs can include processing resource usage cost, storage resource usage cost, communication cost, input/output (I/O) cost, and so forth. An execution plan (which can be an optimal execution plan) from among the candidate execution plans can be selected for execution. Where an optimal execution plan can refer to an execution plan that is associated with a lowest cost or that satisfies some other criterion. The selected execution plan is provided by the optimizer module 110 to the executor module 112.

Figure 2:
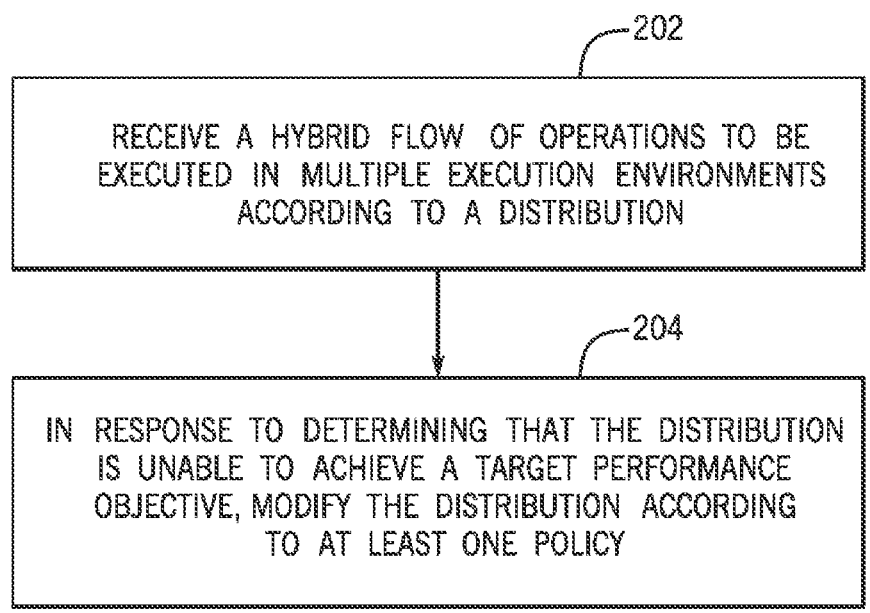
FIG. 2 is a flow diagram of a scheduling process according to some implementations.

FIG. 2 is a flow diagram of a process that can be performed by the hybrid flow management system 106 according to some implementations. The process of FIG. 2 receives (at 202) a hybrid flow of operations to be executed in multiple execution environments according to a distribution, as specified by an execution plan. The execution plan can be provided by the optimizer module 110 to the executor module 112. The distribution of a hybrid flow can refer to where (which execution environments) the flow fragments of the hybrid flow are to execute, and/or to an order or sequence of the flow fragments.

In response to determining that the distribution is unable to achieve a target performance objective or unable to satisfy some other criterion, the distribution can be modified (at 204) according to at least one policy that specifies at least one action to apply to the hybrid flow in response to a corresponding at least one condition relating to a characteristic of the hybrid flow. In some implementations, the at least one action is applied by the optimizer module 110 to modify the execution plan. Modification of the execution plan causes the distribution of the hybrid flow to change. As discussed further below, policies that can be used for modifying a distribution of a hybrid flow can include a policy relating to decomposing a flow into flow fragments, a policy relating to shipping a flow from one execution environment to another execution environment, an aggregate policy that relates to both decomposing and shipping flows, or other policies.

Figure 3:
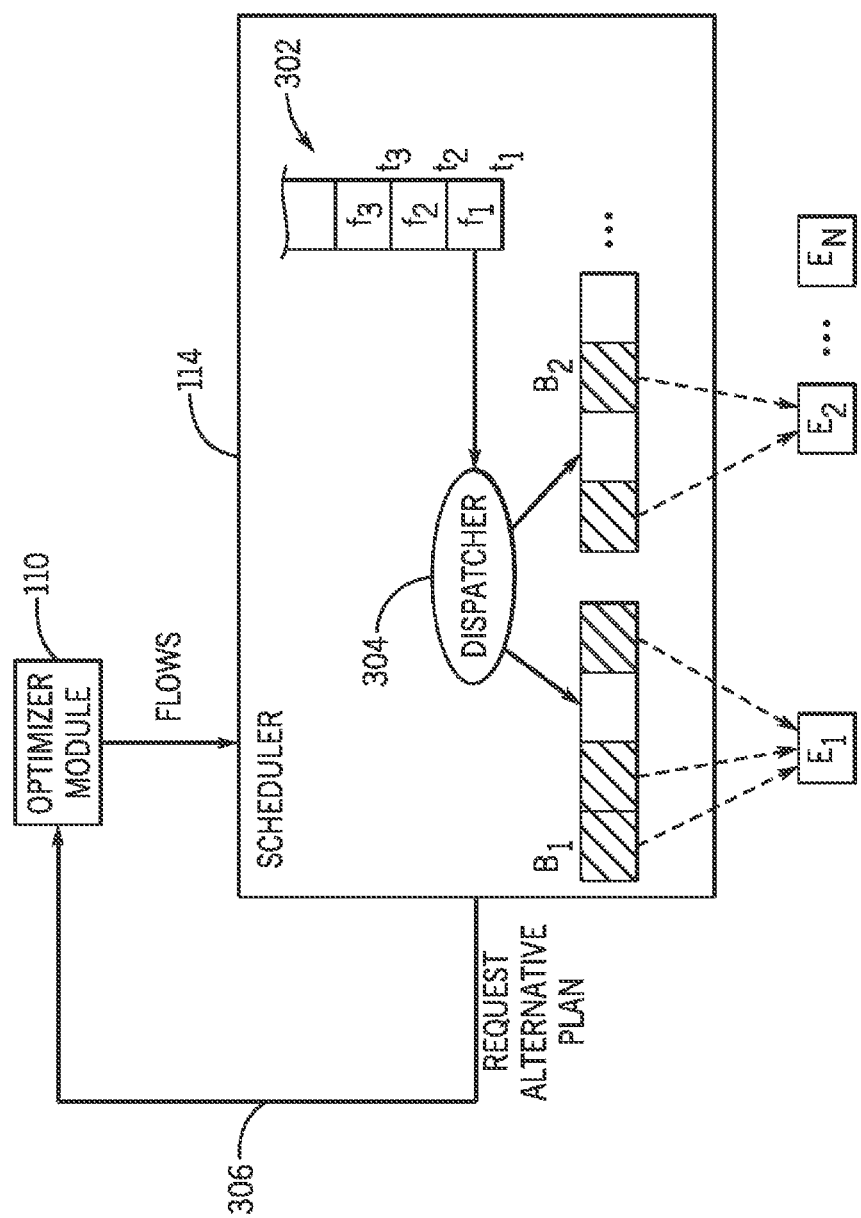
FIG. 3 is a schematic diagram of a process of scheduling a hybrid flow, according to some implementations.

FIG. 3 is a schematic diagram illustrating scheduling of flows, including hybrid flows. Flows are received by the scheduler 114. In some examples, each flow can include start time information and a class identifier. The start time information can specify a start time, or a range (window) of start times, at which a flow is to execute. A class identifier can associate a flow with a workload.

In examples according to FIG. 3, the scheduler 114 uses two data structures: a ready queue 302 and a set of run vectors $B_1, B_2, \ldots, B_N$. Each flow f that is ready to execute (based on the start time information of the flow) enters the ready queue 302. To simplify the discussion, each entry in the ready queue is a flow for a single execution environment. Hybrid flows are considered later. The ready queue 302 orders flows by their arrival time or requested execution time, t. In the example of FIG. 3, the ready queue 302 includes three respective flows $f_1^{E1}$, $f_2^{E2}$, and $f_3^{E2}$ that are associated with three respective start times $t_1$, $t_2$, $t_3$. Flow $f_1^{E1}$ is designated (by the execution plan provided by the optimizer module 104) to execute on execution engine $E_1$, while flows $f_2^{E2}$ and $f_3^{E2}$ are designated to execute on execution engine $E_2$. An execution engine is part of a corresponding execution environment. An execution engine can include one or multiple execution stages for applying respective operators on data, where the operators can transform or perform some other action with respect to data.

Each run vector $B_i$ (i=1 to N) identifies the flow(s) currently executing on the respective execution engine $E_1$, $E_2, \ldots E_N$. Each run vector $B_i$ includes one slot per executing flow. An execution engine $E_i$ can be associated with a respective multi-programming level (MPL), which specifies the maximum number of flows that can concurrently execute on the respective execution engine. The MPL specifies the size of a run vector, since there is one slot per executing flow.

When the run vector $B_i$ for an execution engine $E_i$ has a free slot, an orchestrator 304 in the scheduler 114 searches in order through the ready queue 302 for a flow that uses the execution engine $E_i$. Alternatively, the dispatcher 304 can be external of the scheduler 114. If such a flow is found in the ready queue 302, then the identified flow is dequeued from the ready queue 302, and after plan validation and code generation, the flow is dispatched by the dispatcher 115 to the respective execution engine $E_i$.

In some cases, plan validation may fail. Plan validation includes determining that the execution plan is feasible, such as by determining that requested resources are available in the execution engines. Also, plan validation includes determining that an execution plan is consistent with a target performance objective. For example, an execution plan may have been designed to execute a flow on execution engine $E_1$, but that execution engine may not be available when the execution plan is to be executed. Alternatively, if the average response time of flows in a workload is exceeding a threshold, a flow may be redirected to an execution environment that is less heavily loaded. If the execution plan is deemed not useable, then the plan validation would fail. In response to failure of the plan validation, the scheduler 114 can request (at 306) the optimizer module 104 to provide an alternative execution plan. The alternative plan can be created by the optimizer module 104 by performing a policy-based modification of an execution plan.

The policy-based modification can include a decomposition action and/or a flow shipping action, in some implementations. In other examples, other policy-based modifications can be performed.

A decomposition action takes a single flow and produces an equivalent multi-flow in which the flow fragments are executed sequentially. For example, given a flow implemented as a nested Structured Query Language (SQL) query (that has multiple levels of sub-queries), decomposition can create flow fragments for respective nested sub-queries, where the result of a child sub-query is saved in a table that can be read by a parent sub-query. Each flow fragment can run independently, such as in a separate session.

Executing multiple flow fragments may cause less resource contention single, large flow that uses a large fraction of an execution engine. The flow fragments perform more I/O operations than the single flow due to storing of intermediate results. However, other concurrently running flows may benefit because the resources of the execution environment are shared more equitably and so the overall workload performance may improve.

An example decomposition policy relating to use of a decomposition action can be as follows. First, the resource usage cost of a flow is determined. If the cost of the flow exceeds a threshold budget θ, then the flow is decomposed.

Figure 4:
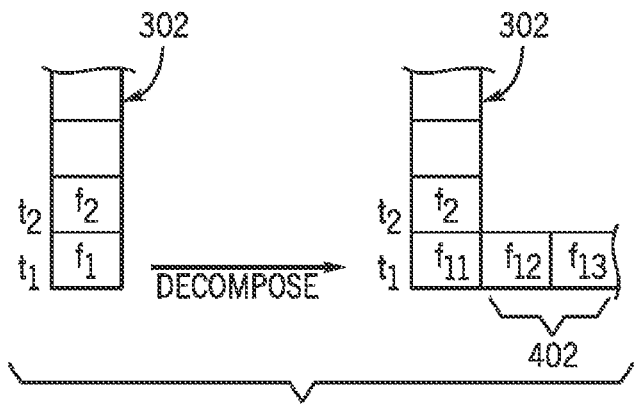
FIG. 4 is a schematic diagram of a process of decomposing a flow into flow fragments, according to some implementations.

Decomposition returns a set $S_f$ of flow fragments. At least some of the flow fragments can be put back into the ready queue 302. As depicted in FIG. 4, it is assumed that the ready queue 302 initially contains two flows $f_1$ and $f_2$ to be executed on an execution engine. Based on evaluation of the decomposition policy, the optimizer module 110 decides to decompose $f_1$ into the flow fragments $S_{f1} = \{f_{11}, f_{12}, f_{13}, \ldots\}$. Although flow fragment $f_{11}$ is placed back into the ready queue 302, note that the other flow fragments of the set $S_{f1}$ are not put immediately put into the ready queue 302. Instead, these other flow fragments ($f_{12}$, $f_{13}$) can be kept in a buffer 402 associated with the ready queue 302.

The first flow fragment, here $f_{11}$, can be dequeued and executed on the execution engine. In response to dequeuing $f_{11}$, the next flow fragment $f_{12}$ can be moved from the buffer 402 to the ready queue 302. If $f_{11}$ terminates before the arrival time $t_2$ of flow $f_2$ in the ready queue 302, the next flow fragment, $f_{12}$, can also be executed on the execution engine. Otherwise, if $f_{11}$ does not terminate before the arrival time $t_2$ of flow $f_2$, the flow $f_2$ is executed on the execution engine, and any other pending flow that has arrived before $f_{11}$ continues until completion.

The foregoing process continues until all flows and flow fragments in the ready queue 302 have been processed.

A flow shipping action takes a flow that is initially designated for running on a first execution engine and reassigns the flow to run on a different engine. Shipping a flow from one execution engine to another execution engine may improve overall performance by off-loading work from a heavily used execution engine onto a lightly used execution engine. A flow shipping policy can specify any one or some combination of the following. A flow is shipped from a first execution engine to a second execution engine if a cost of the flow on the first execution engine exceeds a cost threshold. A flow is not shipped from a first execution engine to a second execution engine if the cost of providing the flow to the second execution engine (where this cost can be an aggregate of the cost of shipping the flow and the cost of executing the flow on the second execution engine) is higher than the cost on the first execution engine.

Note that in addition to the cost of shipping operations associated with a flow, there is also a cost associated with where data accessed by the flow is stored. The cost of data access should be considered when determining whether a flow is to be shipped to a different execution engine and this consideration may include copying the data from one location to another).

The flow shipping action can first identify all execution engines, which are listed in a set Φ, that are able of executing a given flow. For example, an execution engine is able to execute the given flow if all operators of the given flow are supported in the engine. Once this set Φ is identified, then the next-best available execution engine can be identified, such as by using a function top($E_x$); $E_x \in \Phi$. This function may use the top-k (k≥1) execution plans for the given flow produced by the optimizer module 110 to find the best execution plan that uses an available execution engine.

Alternatively, the function may ask the optimizer module 110 to re-optimize the execution plan for the new execution engine.

The previous discussion regarding decomposition and flow shipping actions assumes single-engine flows. Hybrid flows can be handled with minor changes.

In the context of a hybrid flow that has multiple flow fragments, decomposition can be applied on a flow fragment, to decompose the flow fragment into further fragments. Note that, under certain conditions, the decomposition policy can further cause at least two of the flow fragments of the hybrid flow to be composed (combined together). After combining at least two flow fragments together to form a combined flow, the combined flow can subsequently be decomposed again.

For a hybrid flow, one or multiple flow fragments of the hybrid flow can be shipped using the flow shipping action discussed above. Note that the shipping action can also cause the shipping of a flow combined from at least two flow fragments of the hybrid flow.

Let $f_h^{E_x}$ denote a flow $f_h$ to be run on engine $E_x$. A hybrid flow, say $f_h:f_{h1}^{E1} \rightarrow f_{h2}^{E2}$, can be considered as a combination of multiple flow fragments, $f_{h1}^{E1}$ and $f_{h2}^{E2}$, with dependencies (where the flow fragment $f_{h2}^{E2}$ is dependent on the output of the flow fragment $f_{h1}^{E1}$). Similarly, a multi-flow, say $f_m:f_{m1}^{E} \rightarrow f_{m2}^{E}$, which executes on one engine E can be considered as a combination of multiple flow fragments, $f_{m1}^{E}$ and $f_{m2}^{E}$, with dependencies. Thus, each flow fragment gets its own position in the ready queue 302, but the dependencies among the flow fragments are considered before a flow fragment is executed.

Two types of dependencies can exist between a pair of flow fragments. A sequential dependency means a first flow fragment has to terminate before a second flow fragment can begin. For example, flow fragments resulting from decomposition generally have a sequential dependency to ensure that intermediate result tables are written before they are read. A parallel dependency means that the two flow fragments have to start together. This dependency is used when a producer flow fragment pipes data to a consumer flow fragment. The scheduler 114 considers these dependencies when choosing to run a flow fragment. For example, if two flow fragments have a parallel dependency, the scheduler 114 cannot run them until their respective target execution engines both have free slots in the corresponding run vectors.

In the foregoing discussion, it is assumed that the policy-based decomposition action and flow shipping action are performed separately. It is noted that, in some implementations, both a decomposition action and a flow shipping action can be applied. When scheduling a hybrid flow, it is possible to decompose the hybrid flow into a number of flow fragments, and some or all of the flow fragments can be shipped from one execution engine to a different execution engine. Alternatively, it is also possible to ship a hybrid flow to another execution engine first, and then decomposition is applied after the shipping.

A policy that allows for application of both the decomposition action and a flow shipping action can be referred to as an aggregate policy. An example pseudocode for the aggregate policy is provided below.

```
1  input   : The queue Q
2  output  : An execution action
3  f ← Q.pop( );
4  e ← eng(f);
5  if B_E has a free slot && eval(f, E) < θ then
6      execute f on E;
7  else
8      f_x^{Ey} = best (dcmp(f), ship(f^E, f^{E'}) ), where E' is top-1 choice
         from Φ for f;
9      execute f_x on E_y;
10 end
```

Figure 5:
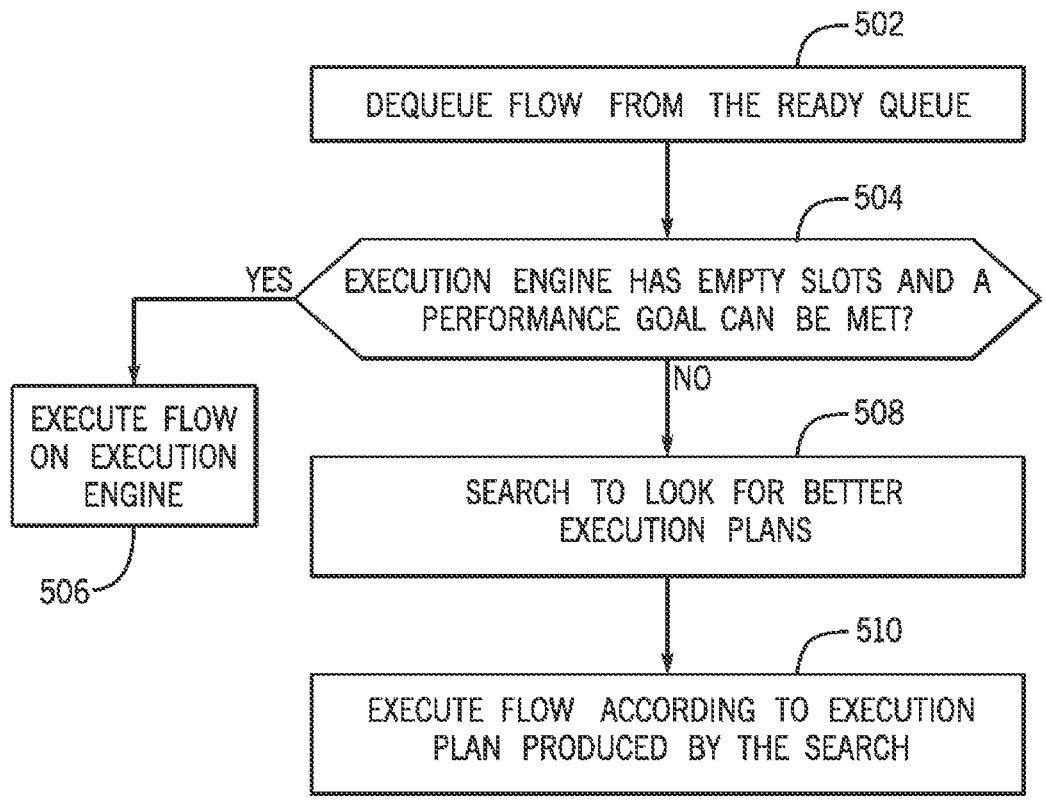
FIG. 5 is a flow diagram of a process of applying an aggregate policy, according to some implementations.

A discussion of the pseudocode is made in conjunction with FIG. 5. The input to the pseudocode is the ready queue Q (302 in FIG. 3), and the output of the pseudocode is an execution action of a flow. It is assumed that, at the head of the ready queue Q (bottom of the ready queue 302 in FIG. 3), there is a flow f that is planned for execution on execution engine E. As also shown in FIG. 5, this flow f is dequeued (at 502) (line 3 of the pseudocode) from the ready queue 302. Next, it is determined (at 504) if the execution engine E has empty slots in the associated run vector ($B_E$) and the flow f can be executed on E while meeting a performance objective (this is computed by a function eval(f, E) at line 5 of the pseudocode). If so, then the flow f can simply be executed (at 506) on the execution engine E (line 6 of the pseudocode). In some examples, the function eval(f, E) can evaluate whether a resource usage cost is less than a threshold budget θ, in examples where the performance objective relates to resource usage. If the determination (at 504) that the performance objective cannot be met or the execution engine E is not available at this time (line 5 of the pseudocode evaluates to false), then a search is performed (at 508) to look for better execution plans that satisfy a performance objective (lines 7-9 of the pseudocode).

The better execution plan can be produced based on performing both the decomposition action and the flow shipping action. At line 7 of the pseudocode, the function best(dcmp(f),ship($f^E,f^{E'}$)) compares two possible strategies, namely the decomposition and shipping strategies, and outputs a flow to execute. The function dcmp(f) decomposes a flow f to a number of flow fragments. The function ship($f^E$, $f^{E'}$) examines the possible variants ($f^E,f^{E'}$) of the same flow executed on different execution engines. Assuming that the set of all valid execution engines that can be used to execute f is noted as Φ (this is computed by the function eng(f) at line 4 of the pseudocode), then for each flow variant to be executed on engine $E_x$, the function eval(f,$E_x$), $\forall E_x \in \Phi$, is computed. The top-1 (i.e. best) solution, which is an execution plan produced based on performing both a decomposition action and flow shipping action, is returned by this computation.

The flow is then executed (at 510) according to the execution plan produced by the search at 508.

Figure 6:
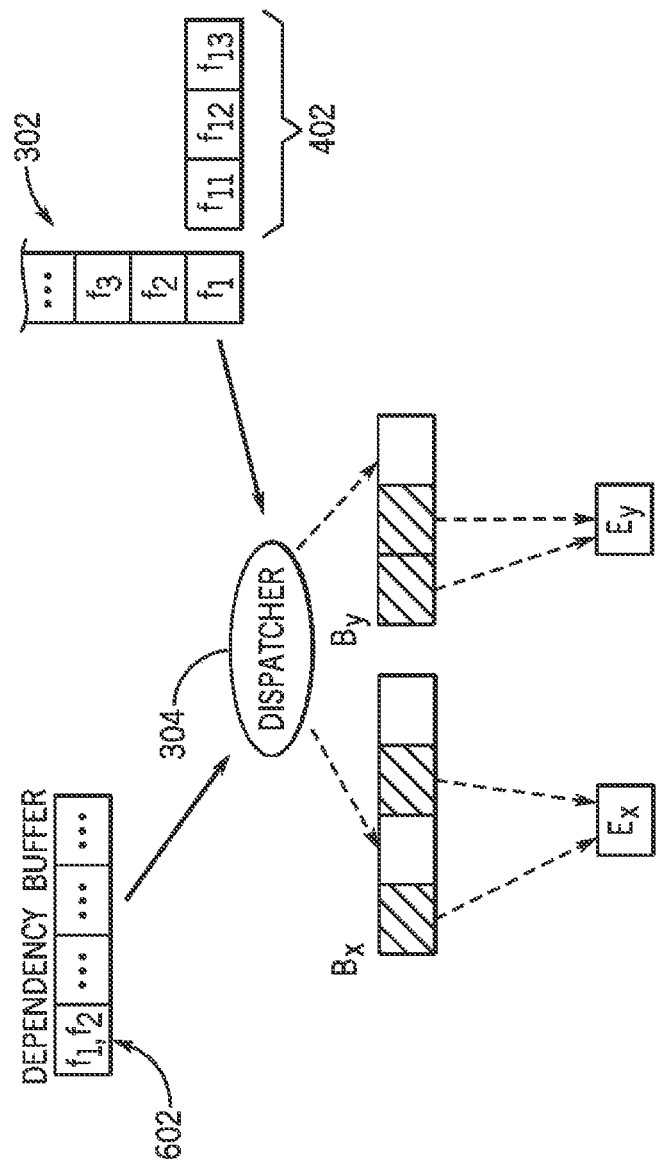
FIG. 6 is a schematic diagram of a process of scheduling a decomposed hybrid flow, according to further implementations.

If a flow includes more than one flow fragment, then the flow fragments have dependencies defined by $f_1 \rightarrow f_2$, which specifies that execution of $f_2$ starts only after $f_1$ has finished. If $f_1$ and $f_2$ are scheduled to run on different execution engines, then the orchestrator 304 can use a dependency buffer 602 to track the dependencies, as shown in FIG. 6. In FIG. 6, one entry of the dependency buffer 602 keeps track of the dependency between $f_1$ and $f_2$.

Assume that the ready queue 302 in FIG. 6 contains a hybrid flow f including two flows $f_1$ and $f_2$. Then, the orchestrator 304 can dequeue the first flow $f_1$ from the head of the ready queue 302. If evaluation of the aggregate policy indicates that this flow $f_1$ should be decomposed into three fragments, $f_{11}$ to $f_{13}$, then the flow $f_2$ cannot be executed until $f_{13}$ finishes. Each of these three flow fragments $f_{11}$ to $f_{13}$ can be shipped to either engine $E_x$ or $E_y$.

Note that if decomposition and shipping are continually performed one after the other, a flow may be trapped in an infinite loop. In practice, this can be avoided by several using safety conditions, such as by setting a maximum number of actions that can be applied on a given flow (e.g. no more than two different actions may be applied to the same flow); setting a minimum size of a flow (e.g. a. flow containing x nodes cannot be further decomposed); disallowing the repeating of the same action to the same flow (e.g. a flow cannot be decomposed or shipped twice), and so forth.

Data and machine-readable instructions can be stored in a machine-readable or computer-readable storage medium or storage media (such as 104 in FIG. 1), which can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A computer system comprising:
   at least one processor; and
   flow management instructions executable on the at least one processor to:
     determine whether an execution plan satisfies at least one specified criterion, the execution plan specifying a distribution of operations of a hybrid flow across a plurality of types of execution environments;
     in response to determining that the execution plan exceeds a computation cost threshold calculated based on resource usage cost to meet an objective, modifying the execution plan and executing based on that modification by sending at least a portion of the hybrid flow from a first execution environment to a second execution environment in response to a cost relating to resource usage at the first execution environment and the second execution environment;
   the sending is further based on a combination of a cost of shipping the at least a portion of the hybrid flow from the first execution environment to the second execution environment, and a cost of accessing data, wherein the hybrid flow includes flow fragments decomposed from the hybrid flow and having dependency relationships that are tracked by different execution environments.

* * * * *